May 5, 1936.  H. A. MUSHAM  2,039,333
PROTRACTOR
Filed Feb. 27, 1935
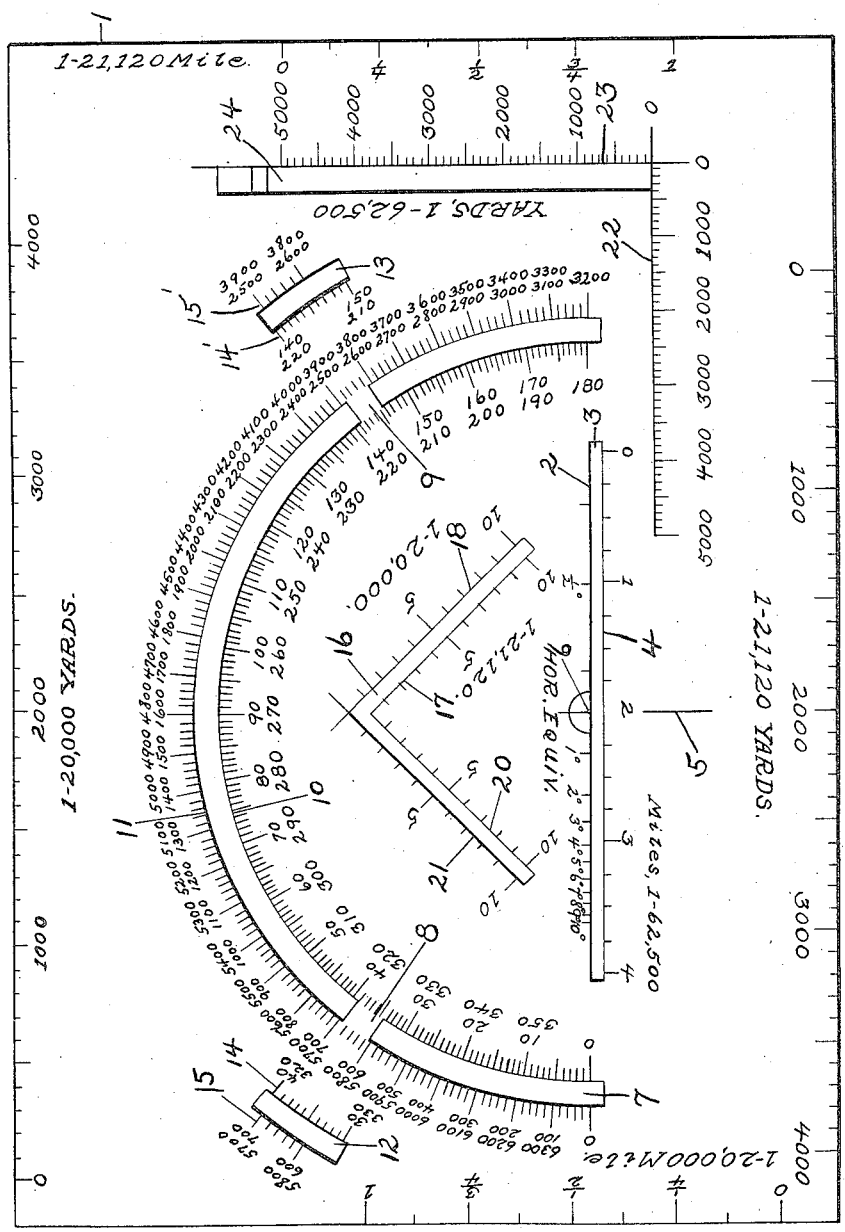
INVENTOR
Harry A. Musham.
By
[signature]
ATTORNEY Patented May 5, 1936

2,039,333

UNITED STATES PATENT OFFICE 2,039,333

PROTRACTOR

Harry A. Musham, Chicago, Ill.

Application February 27, 1935, Serial No. 8,509

1 Claim. (Cl. 33—1)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to measuring devices, but it refers more particularly to an improved military protractor which may be used for laying out to scale or for determining distances and angles on maps or other graphic representations where accuracy of measurement is required.

The instrument set forth in this application is an improvement over that shown in Patent No. 1,660,624, granted to me for a Military protractor, February 28, 1928.

The principal object of the invention is to provide a durable measuring instrument provided with a double protractor scale, by which angular measurements may be readily indicated throughout a range of 180°.

Another object of the invention is to provide a measuring instrument which is simple in construction, inexpensive to manufacture and so constructed as to permit the incorporation therewith of other measuring devices which may be conveniently used in conjunction with the protractor.

The instrument which is preferably formed of a rectangular sheet of transparent material, may be so constructed as to provide several coordinate scales. These scales may be formed around the edges of the sheet and also in the more central portions thereof by providing longitudinal graduated slots at right angles to one or more graduated lines, as will be further described with reference to the drawing, which illustrates the design of the complete protractor.

In the drawing, the numeral (1) indicates a transparent sheet which is cut, shaped and marked to form the protractor, (2) indicates the base line of the protractor which forms the upper edge of the slot (3), the lower edge of said slot being indicated by the numeral (4). Drawn at right angles to the base line (2) and through its center is the center indicating line (5) which marks the vertex (6) of the protractor slot (7). This slot is semi-circular and terminates in a continuation of the lower edge (4) of the slot (3).

In order to strengthen the transparent sheet (1) in the vicinity of the slot (7), the slot is bridged by two connecting members (8) and (9) at about 35° from either extremity thereof.

The inner and outer edges of the slot (7) are marked with angular scales (10) and (11) of different units that extend for 180° around the vertex (6) except at the intersection of the connecting members (8) and (9). These graduations terminate at the extension of the base line (2).

At the closed portions of the semi-circular slot (7) where it is bridged by the connecting members (8) and (9) the slot is continued in short sections at a longer radius from the vertex, as indicated by the numerals (12) and (13).

The scales of these short sections (12) and (13) have the same units of measurement respectively as the scales (10) and (11) marked on the edges of the slot (7). The scales thus marked on the inner and outer edges of the slots (12) and (13) are indicated by the numerals (14), (15) and (14'), (15').

By this construction the circular slots (12) and (13) overlap the spaces where the connecting members (8) and (9) break the continuity of the slot (7). This overlapping of the protractor slots provides continuous scales for the direct measurement of all angles within a range of 180°, as the scales on either edge of the more distant slots (12) and (13) are laid out proportionally as their distance from the vertex (6) and provide the same units of angular measurement as the scales of the inner slot (7).

For the convenience of the operator of these instruments other measuring devices may be incorporated therewith, and conveniently arranged on the remaining unmarked area of the transparent sheet (1). Such measuring devices may consist of a coordinate scale (16) located in the center of the semi-circular protractor slot (7).

This scale may be made with two graduated ground lines (17) and (18) and a single slot (19) located at one end of said lines and at 90° thereto. Both edges of the slot are also graduated to form the scales (20 and (21), all scales being preferably selected for the measurement of coordinates.

Another set of coordinate scales indicated by the lines (22) and (23), the latter of which is marked along one edge of the slot (24), may be printed within the sheet, and the rectangular edges of the entire transparent sheet as well as the edges of slot (3) may be adapted for the formation of suitable scales which can be conveniently used in conjunction with the protractor.

Having described my invention, what I claim as new and wish to secure by Letters Patent is:

A measuring device of the class described comprising a rectangular sheet of suitable material provided with a slot extending parallel to a longitudinal edge thereof, one edge of said slot being marked centrally to indicate the vertex of a protractor, said protractor comprising a semi-circular main slot the opposite edges of which are calibrated to different scales and the slot bridged at suitable localities by connecting members to retain the rigidity of said sheet, and auxiliary arcuate slots having the same vertex as the aforesaid main slot, located exterior the main slot and in spaced relation thereto, said auxiliary slots being graduated on each edge with scales corresponding respectively to those of said main slot and adapted to complete the scales inscribed at the edges of said main slot at the portions where it is bridged by the connecting members.

HARRY A. MUSHAM.